US011911318B2

(12) United States Patent
Kenalty et al.

(10) Patent No.: US 11,911,318 B2
(45) Date of Patent: Feb. 27, 2024

(54) RAPID EVACUATION SLED FOR PATIENTS AND VICTIMS

(71) Applicants: Christopher Kenalty, Schomberg (CA); Miriam Gordon, Mississauga (CA)

(72) Inventors: Christopher Kenalty, Schomberg (CA); Miriam Gordon, Mississauga (CA)

( * ) Notice: Subject to any disclaimer, the term of this patent is extended or adjusted under 35 U.S.C. 154(b) by 16 days.

(21) Appl. No.: 17/179,684

(22) Filed: Feb. 19, 2021

(65) Prior Publication Data

US 2021/0169713 A1 Jun. 10, 2021

Related U.S. Application Data

(63) Continuation-in-part of application No. 15/392,792, filed on Dec. 28, 2016, now Pat. No. 10,932,963.

(51) Int. Cl.
*A61G 1/013* (2006.01)
*A47C 27/15* (2006.01)
(Continued)

(52) U.S. Cl.
CPC .............. *A61G 1/013* (2013.01); *A47C 27/15* (2013.01); *A47C 31/001* (2013.01); *A47C 31/007* (2013.01); *A61G 1/044* (2013.01)

(58) Field of Classification Search
CPC ..... A47C 27/15; A47C 31/001; A47C 31/007; A61G 1/01; A61G 1/013; A61G 1/02; A61G 1/044; A61G 1/048
See application file for complete search history.

(56) References Cited

U.S. PATENT DOCUMENTS 2,788,530 A 4/1957 Ferguson
4,124,908 A 11/1978 Burns et al.
(Continued)

FOREIGN PATENT DOCUMENTS

DE 202012004581 U1 6/2012
GB 2203951 B 1/1991
WO 86/07253 A1 12/1986

OTHER PUBLICATIONS

Extended European Search Report dated Jul. 13, 2020, from European Patent Application No. 17888542.2.
(Continued)

*Primary Examiner* — Justin C Mikowski
*Assistant Examiner* — Amanda L Bailey
(74) *Attorney, Agent, or Firm* — KATTEN MUCHIN ROSENMAN, L.L.P.

(57) ABSTRACT

Described is a rollup evacuation sled that includes a bottom sheet, a foam mattress disposed above the bottom sheet, and a support sheet disposed above the mattress. A margin stack including the bottom sheet and the support sheet forms a sandwiched margin left side and a sandwiched margin right side. The sled may further include a plurality of spinal boards disposed between the bottom sheet and the mattress in the upper section of the bottom sheet. Wheel assemblies are mounted on each spinal board. The sled further includes a foot pouch coupled to the sandwiched margin left and right sides and dimensioned to substantially enclose feet and calves of a person lying on the support sheet. The foot pouch is configured to store a stack including the bottom sheet, mattress and the support sheet, when the stack is rolled up along a longitudinal direction from the head end.

21 Claims, 10 Drawing Sheets

(51) Int. Cl.
*A61G 1/044* (2006.01)
*A47C 31/00* (2006.01)

(56) References Cited

U.S. PATENT DOCUMENTS

| | | | | |
|---|---|---|---|---|
| 4,566,445 | A | 1/1986 | Jelsma et al. | |
| 4,601,075 | A * | 7/1986 | Smith | A61G 1/044 5/628 |
| 4,601,076 | A * | 7/1986 | Knobeloch | A47C 27/00 5/413 R |
| 4,627,428 | A * | 12/1986 | Brooks | B60R 22/105 5/625 |
| 4,736,474 | A | 4/1988 | Moran et al. | |
| 4,793,008 | A | 12/1988 | Johansson | |
| 4,922,562 | A | 5/1990 | Allred et al. | |
| 5,044,031 | A | 9/1991 | Sherwood | |
| 5,050,254 | A | 9/1991 | Murphy | |
| 5,088,137 | A | 2/1992 | Rose | |
| 5,121,514 | A * | 6/1992 | Rosane | A61G 1/01 5/628 |
| 5,189,746 | A | 3/1993 | Horie | |
| 5,386,604 | A | 2/1995 | Ricketts | |
| 5,699,568 | A | 12/1997 | Couldridge | |
| 5,701,619 | A * | 12/1997 | Ullman | A61G 1/01 5/628 |
| 5,729,850 | A | 3/1998 | Eskeli | |
| 5,819,349 | A * | 10/1998 | Schwartz | A47C 27/001 5/722 |
| 5,839,137 | A * | 11/1998 | Butler | A61G 1/01 5/89.1 |
| D421,413 | S | 3/2000 | Calkin | |
| 6,363,936 | B1 | 4/2002 | McCormick | |
| 6,871,368 | B2 | 3/2005 | Calkin | |
| 6,948,203 | B2 | 9/2005 | Tsai | |
| 7,610,641 | B2 | 11/2009 | Frost | |
| 7,614,103 | B2 | 11/2009 | Beaudry et al. | |
| 7,774,877 | B2 | 8/2010 | Kenalty et al. | |
| 8,006,334 | B2 | 8/2011 | Kenalty et al. | |
| 8,122,543 | B2 | 2/2012 | Kenalty et al. | |
| 8,316,487 | B2 | 11/2012 | Kenalty et al. | |
| 8,365,326 | B2 | 2/2013 | Kenalty et al. | |
| 8,615,829 | B2 | 12/2013 | Kenalty et al. | |
| 8,672,842 | B2 | 3/2014 | Kenalty et al. | |
| 8,713,731 | B2 | 5/2014 | Kenalty et al. | |
| 8,793,827 | B1 | 8/2014 | Smart | |
| 8,881,327 | B2 | 11/2014 | Kenalty et al. | |
| 8,898,839 | B2 | 12/2014 | Kenalty et al. | |
| 8,938,828 | B2 | 1/2015 | Kenalty et al. | |
| 9,756,951 | B1 * | 9/2017 | Stewart, Jr. | A47C 19/025 |
| 9,827,152 | B1 | 11/2017 | Calkin | |
| 2002/0162171 | A1 * | 11/2002 | Faz | A61G 1/013 5/625 |
| 2007/0180625 | A1 | 8/2007 | Walke et al. | |
| 2007/0278754 | A1 | 12/2007 | Walkingshaw | |
| 2008/0134436 | A1 | 6/2008 | Beaudry et al. | |
| 2008/0301876 | A1 | 12/2008 | Kenalty | |
| 2010/0005593 | A1 | 1/2010 | Bowling et al. | |
| 2010/0251479 | A1 | 10/2010 | Kenalty et al. | |
| 2010/0299836 | A1 | 12/2010 | Tanaka et al. | |
| 2011/0177733 | A1 | 7/2011 | Grimes | |
| 2011/0185504 | A1 | 8/2011 | Kenalty et al. | |
| 2012/0053423 | A1 | 3/2012 | Kenalty et al. | |
| 2012/0151679 | A1 | 6/2012 | Kenalty | |
| 2013/0276235 | A1 * | 10/2013 | Kenalty | A61G 1/0287 5/627 |
| 2014/0053335 | A1 | 2/2014 | Calkin | |
| 2015/0143634 | A1 * | 5/2015 | Beaulieu | A61G 1/044 5/628 |
| 2016/0151192 | A1 | 6/2016 | Slishman | |

OTHER PUBLICATIONS

Notice of Allowance dated Oct. 29, 2020, from U.S. Appl. No. 15/392,792, 29 sheets.
Non-Final Rejection dated Apr. 30, 2020, from U.S. Appl. No. 15/392,792, 38 sheets.
Final Rejection dated Sep. 27, 2019, from U.S. Appl. No. 15/392,792, 35 sheets.
Non-Final Rejection dated Mar. 20, 2019, from U.S. Appl. No. 15/392,792, 38 sheets.
International Search Report and Written Opinion dated Apr. 13, 2018, from PCT/IB2017/001257, 10 sheets.
Non-Final Rejection dated Aug. 23, 2022, from U.S. Appl. No. 17/187,100, 48 sheets.
Notice of Allowance dated Apr. 28, 2023, from U.S. Appl. No. 17/187,100, 11 sheets.
Final Rejection dated Jan. 12, 2023, from U.S. Appl. No. 17/187,100, 39 sheets.

* cited by examiner

RAPID EVACUATION SLED FOR PATIENTS AND VICTIMS

CROSS REFERENCE TO RELATED APPLICATIONS

This application is a continuation-in-part (CIP) application of U.S. application Ser. No. 15/392,792, filed on Dec. 28, 2016, which herein is incorporated by reference in its entirety.

BACKGROUND OF THE INVENTION

1. Technical Field

The present invention relates to a rapid evacuation device and method for patients and victims, and more particularly to a fold-up, wheeled, patient-enclosing sled for rapid evacuation during emergency and non-emergency situations. More particularly, the invention relates to such a compact device that folds up for stowage, but can be quickly deployed and used to evacuate an individual.

2. Background Art

Evacuation sleds are used by hospitals, assisted living facilities, emergency services, etc., to rapidly and safely evacuate patients from danger zones, such as flood areas, fires, explosions, etc., or to transport patients from one location to another. The patient is typically transferred from a bed into the r sled, lowered to the floor, and then evacuated by pulling or dragging a tow strap affixed to the sled. An efficient evacuation sled can be deployed and used by a single nurse or other caregiver. An evacuation mattress is disclosed in International Application Number PCT/NL 86/00015, published Dec. 18, 1986 under No. WO 86/07253, based on a Netherlands application filed Jun. 12, 1985. The mattress is characterized by belts or ropes to be put around the patient, which are permanently fastened to the sled. Such a mattress, while very useful, may be relatively expensive to buy, store, and maintain.

While many sled-type patient evacuation devices are known (such as the evacuation sled disclosed in U.S. Patent Publication No. 2007/0278754 to Walkingshaw), these sleds require several caregivers to transfer the patient into the sled for evacuation, and typically comprise one thin sheet of semi-flexible plastic. The sleds are then dragged through the hospital, down numerous flights of stairs, and then to an evacuation center where the patient waits (often for hours) for transportation to a hospital, where the patient must be removed from the sled and placed in a bed (again requiring several caregivers). This leads to problems such as contusions in the patient from being bounced down steps, patient hypothermia, and the necessity for many caregivers to perform the multiple patient-transfer steps.

Other known structures for evacuating non-ambulatory persons include boards or mats to support the patient. For example, U.S. Pat. No. 4,793,008 to Johansson discloses rigid mats with straps, respectively placed beneath the patient's chest and thighs. A relatively complicated Rescue Transportation Mattress is disclosed in U.S. Pat. No. 4,736,474 to Moran et al., wherein an inflatable support member and crossed straps are used to secure the person being transported. Again, such solutions do little for a quick, safe, and warm evacuation of a patient from a facility during an emergency.

A commercially successful evacuation sled is the Evacusled™. This is a tough plastic sheath, which surrounds the patient while the patient is still in his/her mattress. See, for example, U.S. Pat. No. 8,713,731. Wheels on the bottom provide enhanced mobility, and pull straps on front and back allow easy maneuvering. A drawback to this design is that the sheath must be positioned underneath the patient's mattress, and the entire mattress is evacuated together with the patient. See also, U.S. Pat. Nos. 8,938,828; 8,898,839; 8,881,327; 8,672,842; 8,615,829; 8,365,326; 8,316,487; 8,122,543; 8,006,334; and 7,774,877.

There are numerous other patents and patent applications employing rigid or semi-rigid supports and belts or straps to secure the person transported to the support. One apparent disadvantage to this use of straps or belts is that they could exert undue or excessive pressure on particular locations on the bodies of some evacuees, such as in the case of recent-surgery patients. Further, such sleds are often hard on the patient-support surface, and provide little cushioning to the patient as he/she is transported (often) over rough surfaces.

Thus, what is needed is an economical emergency evacuation sled for evacuating patients from hospitals, subways, homes, high rises, etc., that is capable of operation by a single care-giver, may be folded-up to fit within a compact space, provides a warm and secure cocoon for the patient, allows easy transport over any type of surface (e.g., up and down stairs), provides proper support for all of the patient's body, allows the patient to feel a high degree of comfort in what is otherwise a very stressful situation, and provides securing means (e.g., straps) to firmly hold the patient in place during transit.

SUMMARY

The present disclosure endeavors to provide an economical fold-up mattress for patients that overcomes certain of the problems noted above.

According to a first aspect of the present invention, a foldup patient-evacuation sled has a bottom sheet having a head end and a foot end. A foam mattress is disposed above the bottom sheet, and a patient support sheet is disposed above the mattress. The bottom sheet, the mattress, and the patient support sheet form a sandwiched bottom, a sandwiched left side, and a sandwiched right side. The sandwiched left side and the sandwiched right side are preferably dimensioned to respectively enclose at least portions of left and right sides of a patient lying on the sandwiched bottom. The bottom sheet and the patient support sheet preferably form a sandwiched margin left side and a sandwiched margin right side. A foot section is coupled to the bottom sheet and is dimensioned to substantially enclose the patient's feet and calves when the foot section is folded upward over the calves of the patient. The foot section is configured to fit beneath the sandwiched left side and the sandwiched right side when the patient is strapped within the sled. A plurality of spinal boards is disposed substantially perpendicular to a longitudinal axis of the sled, each spinal board being disposed above the bottom sheet and spaced apart from each other so that the sled may be folded in the direction of the longitudinal axis. The plurality of spinal boards is disposed more toward a head end of the sled than a foot end of the sled. At least one anti-wear surface is disposed on a bottom surface of the bottom sheet, the at least one anti-wear surface being disposed more toward the head end of the sled than the foot end of the sled. A plurality of wheel assemblies is mounted on each spinal board, each wheel assembly having a wheel portion extending through respective holes in the bottom sheet.

According to a second aspect of the present invention, a patient-evacuation sleds has a flexible bottom plastic sheet having a head end and a foot end. A foam mattress is disposed above the bottom sheet. A flexible plastic patient support sheet is disposed above the foam mattress. A semi-rigid plastic sheet is disposed below the bottom sheet. At least three spinal boards are disposed between the bottom sheet and the foam mattress, each spinal board extending in a direction substantially perpendicular to a longitudinal axis of the patient-evacuation mattress and having at least five wheel assemblies coupled to a bottom surface thereof. The bottom sheet and the semi-rigid plastic sheet each have at least one opening therein configured so that the spinal board wheel assemblies extend therethrough. The at least three spinal boards are disposed more toward the head end than the foot end of the bottom sheet. The bottom sheet and the patient support sheet are preferably sewn together around at least a majority of a periphery thereof, to form a margin zone, which has substantially no foam mattress between the bottom sheet and the patient support sheet. At least chest, waist, and knee straps are coupled to the margin zone and are disposed substantially perpendicular to a longitudinal axis of the sled. The chest, waist, and knee straps are configured to enclose a patient lying on the patient support surface such that at least a portion of the foam mattress encloses at least a portion of the patient.

According to a third aspect of the present invention, a patient evacuation sled has a bottom flexible plastic sheet, a foam layer disposed above the bottom sheet, and at least one rigid spinal board disposed between the bottom sheet and the foam layer. A patient support plastic sheet is disposed above the foam layer. The bottom sheet, the foam layer, and the patient support sheet form a sandwiched portion configured to underlie a patient lying on the patient support sheet. Peripheral edge portions of the bottom sheet and the patient support sheet are coupled together with substantially no foam layer therebetween. A plurality of substantially horizontal straps is disposed substantially perpendicular to a longitudinal axis of the sled, and is coupled to the peripheral edge portions, and configured to, when tightened, at least partially enclose said patient in a cylindrically shaped cocoon. A plurality of wheel assemblies is coupled to each of the at least one spinal boards, at least a portion of each wheel assembly extending through corresponding holes in the bottom sheet.

DETAILED DESCRIPTION

Figure 1:
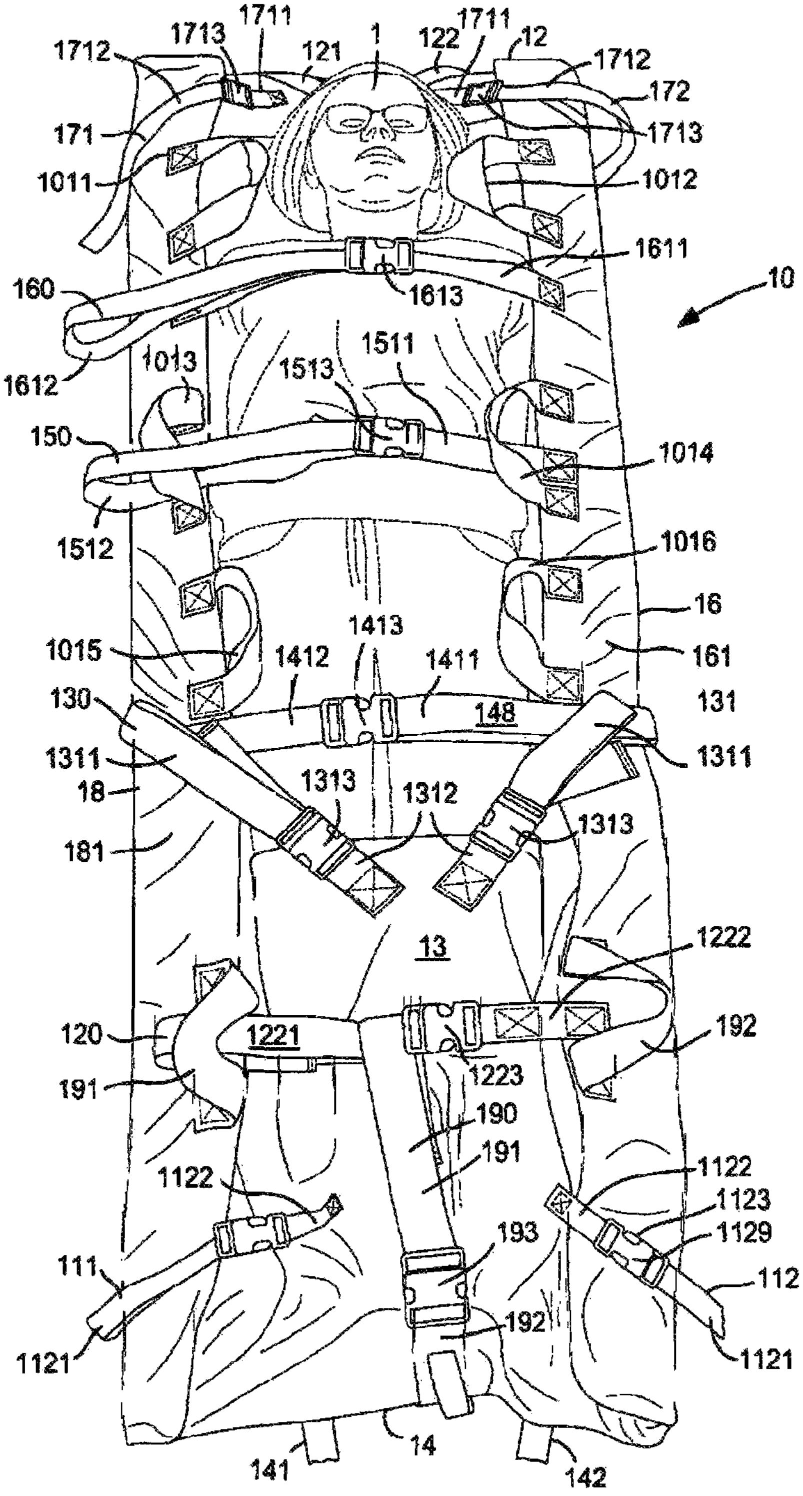
FIG. 1 is a front perspective view of a patient cocooned in the foldup patient evacuation sled according to a first embodiment of the present invention.

Preferred embodiments of the present invention will be described herein below with reference to the accompanying drawings. In the following description, well-known functions or constructions are not described in detail since they would obscure the invention in unnecessary detail.

As to nomenclature (and with reference to FIG. 1), each evacuation sled 10 has a "head" or "top" end 12 (where the head of a patient 1 will be positioned), a "foot" end 14, a "left" side 16 (when viewed from the supine patient's position), and a "right" side 18. With the patient 1 lying in the sled positioned on the ground, as in FIG. 1, "above" will refer to the direction in which the patient looks, and "below" will refer to the opposite direction. The mattress has a longitudinal axis from the head end 12 to the foot end 14. As can be seen, a portion 161 of the left side of the sled is configured to at least partially enclose the left side of the patient when the various straps are tightened. This provides a comforting cocoon for the patient in the sled, and also adds to the structural strength of the partially-cylindrically-shaped patient-and-sled combination. A portion 181 of the right side of the sled is also configured to enclose at least a portion of the patient in the sled similar to the portion 161. As will be described further below, at least a portion of the portions 161 and 181 will include foam mattress to further comfort and cushion the patient.

FIG. 1 is a front perspective view of the patient evacuation sled 10 according to a first embodiment of the present invention. The sled can be folded up in a direction of the longitudinal axis, generally in about three, four, or five folds. Preferably, the folded-up mattress is approximately 20-36 inches long, 20-36 inches wide, 3-6 inches thick, and weighs approximately 14-18 pounds. An optional label pouch may comprises a clear plastic envelope which may contain information such as patient information, mattress information, hospital information, or a blank sheet which may be used by triage personnel. The unfolded sled may be approximately 35.5 inches wide×80 inches long×1.5 inches thick, but may be larger or smaller depending on the size of the individual being carried. For example, in bariatric situations, the mattress may be substantially wider in order to accommodate the girth of the patient.

As will be described in more detail below with respect to FIG. 4, each sled has a bottom sheet 50 of flexible plastic (e.g., Vintex), a wear sheet 94 of semi-rigid PVC plastic disposed below at least a portion of the bottom sheet, and wheel assemblies 64 affixed to rigid (plastic or wood) spinal boards 60, 62, and 63. Above the spinal boards may be an intermediate sheet 92 of flexible or semi-flexible plastic. A foam mattress 90 is disposed above the spinal boards to support the patient in comfort and give some cushioning to the relatively hard surface of the spinal boards. Above the foam mattress is preferably a PVC stiffening layer 80*a*. A patient support flexible plastic sheet 80 is provided above the stiffening layer 80*a* and is the uppermost sheet upon which the patient will lie.

The sled 10 has numerous straps to both secure the patient in place and provide towing of the sled. For example, towing straps 141 and 142 are affixed (by sewing, and/or gluing, and/or heat welding, etc.) at the foot end and are preferably "T"-ed or "V"-ed to a single towing strap. In the preferred embodiment, the head strap is "T"-ed while the foot tow strap is "V"-ed. With these towing straps, a single caregiver can tow the patient and sled to safety, from either the head end or the foot end. The towing is made easier by the provision of the wheel assemblies on the bottom surface, as will be described in further detail below. Similar towing straps 121 and 122 are provided at the head end 12 where towing can be performed in conjunction with or in alternative to use of the straps 141 and 142.

Also at the foot end 14 are, preferably, angled foot end straps 111 and 112. Each strap has a strap portion 1121 and a connector portion 1122. Preferably, the strap portions are affixed to the bottom surface of the bottom sheet, while the connector portions are affixed to a top surface of a foot flap 13, which is affixed to the sled foot end 14 and folds upward over the feet and knees of the patient. When connected and tightened, these angled foot straps provide additional support to the patient and ensure that the corners of the sled-patient combination have no extended corners, which could catch on obstructions during an evacuation. While the preferred embodiment features click-together plastic connectors 1123 and 1124, any convenient means of connecting the strap portions, such a hook-and-fastener, Velcro, tying, may be adopted.

Above the angled foot straps is a horizontal knee strap 120, preferably comprising a strap portion 1221, a strap connector portion 1222, and a connector 1223 (similar to that described above). The knee strap preferably overlies the foot flap 13, and is preferably affixed to bottom surface of the bottom sheet at the left and right sides 16 and 18, at points between the ends of loop handles 191 and 192 (to be described further below). The knee strap 120, when connected together and tightened, further ads to the structural rigidity of the patient-sled combination. A vertical foot strap 190 has a strap connector portion 192 affixed to the foot end 14, a connector 193, and a strap portion 191 which is configured to loop up and around the knee strap 120. When connected and tightened, this vertical foot strap also enhances the integrity of the sled and minimizes any exposed parts during towing.

Above the horizontal knee strap 120 are two angled thigh straps 130 and 131. Like the above-described straps, each angled thigh strap comprises a strap portion 1311, a strap connector portion 1312, and a connector 1313. Preferably, the connector portions 1312 are affixed to the top surface of the foot flap 13 at a substantially forty-five degree angle with respect to the sled longitudinal axis. Of course, the angle may be varied from approximately fifteen degrees through approximately seventy-five degrees. Preferably, the strap portions 1311 are affixed to the bottom surface of the bottom sheet at the same angle as the strap connector portions. When connected and tightened, these angled thigh straps pull the foot flap 13 upward and outward, and ensure that the patient's thighs are fully covered and not exposed.

Also above the horizontal knee strap 120 is a horizontal thigh strap 140. Like the horizontal knee strap 120, it comprises a strap portion 1411, a strap connector portion 1412, and a connector 1413. Preferably, the strap portion 1411 is affixed to the bottom sheet at the left side 16, while the strap connector portion is affixed to the bottom sheet at the right side 18. When connected and tightened, the horizontal thigh strap 140 also pulls the sandwiched portion (the sandwich comprising the patient support sheet, the stiffening layer, the foam mattress, and the bottom sheet) of the left and right sides up and about at least a portion of the left and right sides of the patient. This tightening also adds to the structural rigidity of the patient-sled combination, and also brings the sandwiched cushioning upward from the bottom of the sled to cushion at least the patient's sides.

Above the horizontal knee strap 140 is, preferably, a horizontal waist strap 150. This waist strap comprises a strap portion 1511, a strap connector portion 1512, and a connector 1513. Preferably, the strap portion 1511 is affixed to the bottom sheet at the left side 16, while the strap connector portion 1512 is affixed to the bottom sheet at the right side 18. When connected and tightened, the horizontal waist strap 150 also pulls the sandwiched portion of the left and right sides up and about at least a portion of the left and right sides of the patient.

Above the horizontal waist strap 150 is, preferably, a horizontal chest strap 160. The chest strap 160 preferably comprises a strap portion 1611, a strap connector portion 1612, and a connector 1613. Preferably, the strap portion 1611 is affixed to the bottom sheet at the left side 16, while the strap connector portion 1612 is affixed to the bottom sheet at the right side 18. When connected and tightened, the horizontal chest strap 160 also pulls the sandwiched portion of the left and right sides up and about at least a portion of the left and right sides of the patient, and adds to the structural rigidity of the patient-sled combination.

Above the horizontal chest strap 160, and preferably also above the head of the patient, are two angled head straps 171 and 172. Each strap preferably comprises a strap portion 1711 affixed to an upper surface of the patient support sheet 80, a strap connector portion 1712 affixed to the bottom surface of the bottom sheet 50, and a connector 1713. Again, tightening these two angled head straps enhances structural integrity and keeps all portions of the patient and sled in one compact bundle.

Notable in the current embodiment is that the various straps are color coded to make connections/disconnections quick and easy. For example, the two angled foot straps and the vertical foot strap are preferably black; the horizontal knee strap is preferably green; the angled thigh straps are preferably green; the horizontal thigh strap is preferably yellow; the horizontal waist strap is preferably black; the horizontal chest strap is preferably orange; the angled head straps are preferably orange; the head and foot tow straps are preferably orange; and the loop handles are preferably red. The bottom sheet, the patient support sheet, and the anti-wear sheet are all preferably yellow. Of course, the color scheme(s) can vary, so long as a caregiver can quickly and easily strap/unstrap a patient in a high stress environment. Not also that it is possible to cross-connect the various straps to provide more secure fastening of patients of different dimensions. For example, small-dimensioned patients may benefit by cross-strapping one or more of the horizontal thigh strap, the horizontal waist strap, and the horizontal chest strap.

Also in FIG. 1 are shown head handles 1011 and 1012, chest handles 1013 and 1014, waist handles 1015 and 1016, and knee handles 191 and 192. Preferably, each handle is a loop handle with the ends thereof affixed to a bottom surface of the bottom sheet 50. As can be seen, the handles are preferably disposed more toward the head end than the foot end, to support the patient weight, which is typically similarly disposed.

Figure 2:
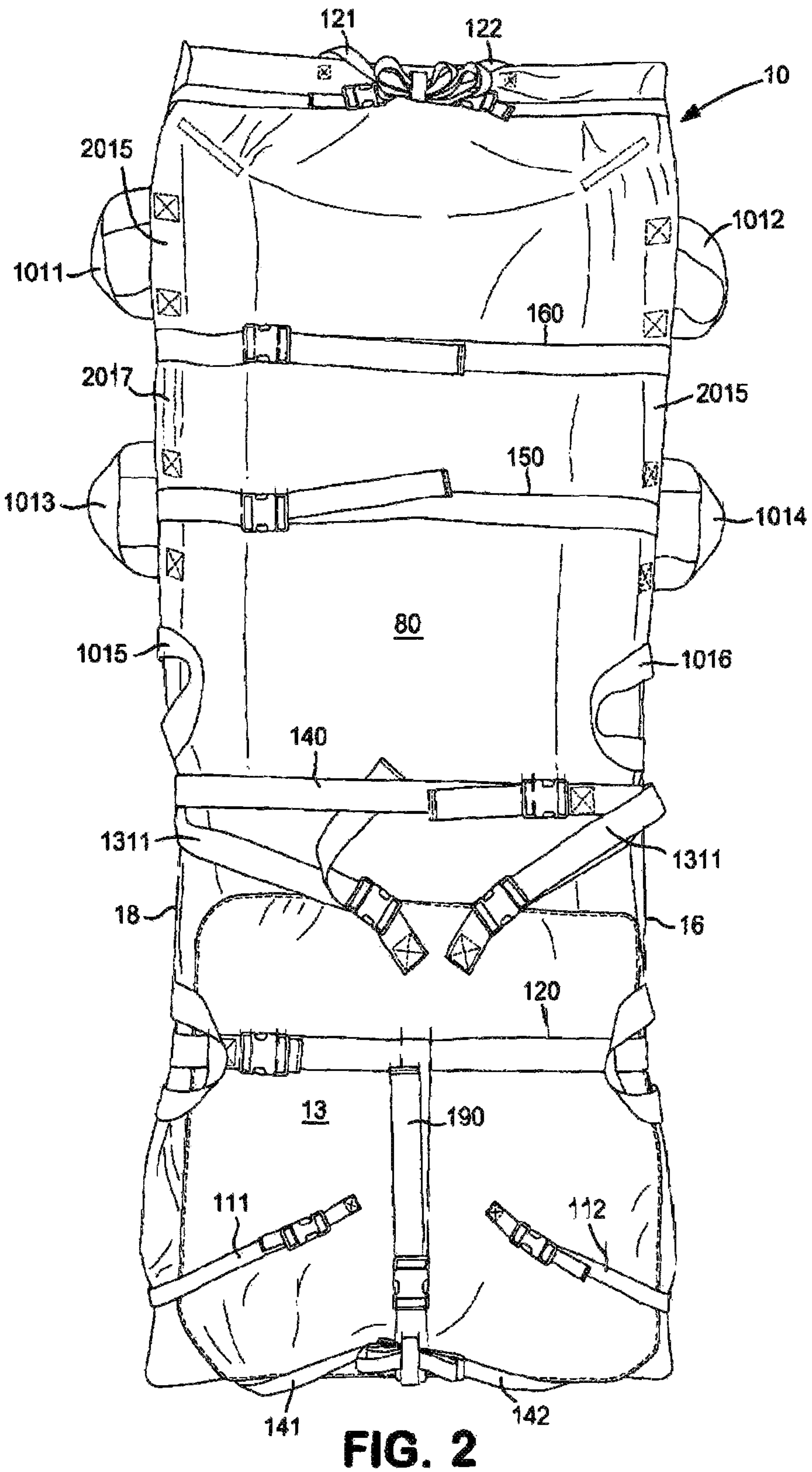
FIG. 2 is a front view of the FIG. 1 embodiment.

FIG. 2 shows a top view of the sled 10 without the patient, where the left and right sides 16 and 18 are opened. As can be seen, the patient support surface 80 extends all the way to the edges of the left and right sides. Notably, the foam mattress does not extend so far. In particular, as mentioned earlier, the "sandwich" portion comprises the patient support sheet 80, the stiffening layer 80*a*, the foam mattress 90, and the bottom sheet 50. This sandwich provides the comfort, protection, safety, and structural stability to the patient-sled. This sandwich portion underlies the patient and encompasses at least portions of the patient's left and right sides, as shown in FIG. 1. However, at peripheral portions of at least the left and right sides 16 and 18 is one or more margin sandwich portions (2015 in FIG. 2). In these margin portions, the sandwich comprises all except for the foam mattress. This gives a flatter surface on which to affix (e.g., stitch) the various straps and handles. In order to provide further structural rigidity to these margin portions, however, the preferred embodiment includes a reinforcing strap 2017 running longitudinally around the margin portions. Thus, the preferred margin sandwich portion also includes this reinforcing strap. In the preferred embodiments, this reinforcing strap, the handles, the horizontal and vertical straps all comprise nylon webbing similar in material and dimensions to that used in auto seat belts.

Figure 3:
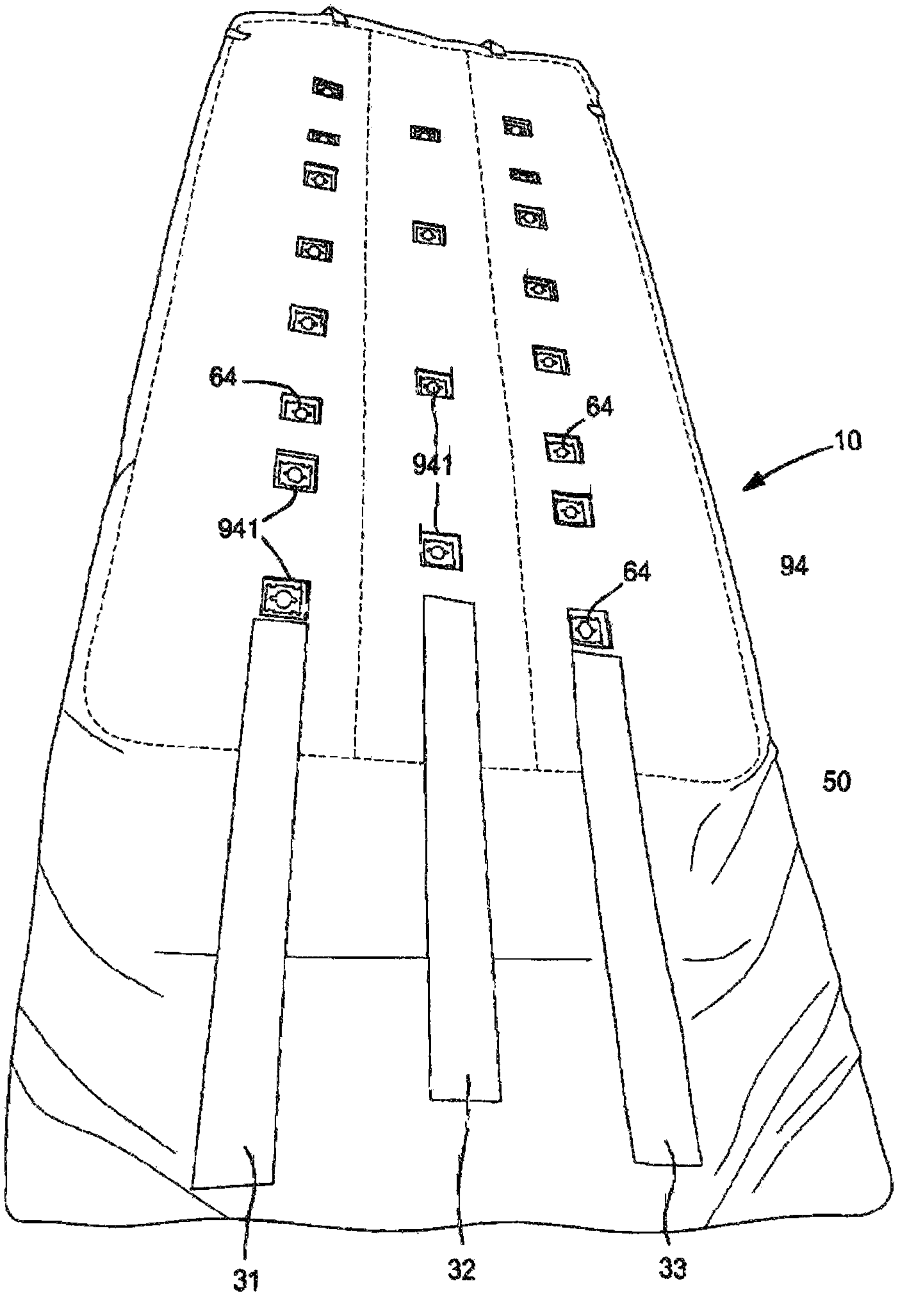
FIG. 3 is a bottom perspective view of the FIG. 1 embodiment.

FIG. 3 is a perspective bottom view of the sled 10 showing the bottom surface of the bottom sheet 50 and the PVC ant-wear sheet 94 affixed (e.g., stitched) thereto. This anti-wear sheet is semi-rigid PVD several centimeters thick, and adds durability to the bottom of the sled in instances where multiple evacuations or extended evacuations are needed. Notably, the openings 941 in the sheet 94 are not affixed to the bottom sheet adjacent these openings. This allows the ant-wear sheet 94 to offer flexibility (give and take in shear) as the sled is moved. Three optional ant-skid strips 31, 32, and 33 are also affixed to the bottom of the bottom sheet 50, in embodiments where a braking function may be desirable.

Figure 4:
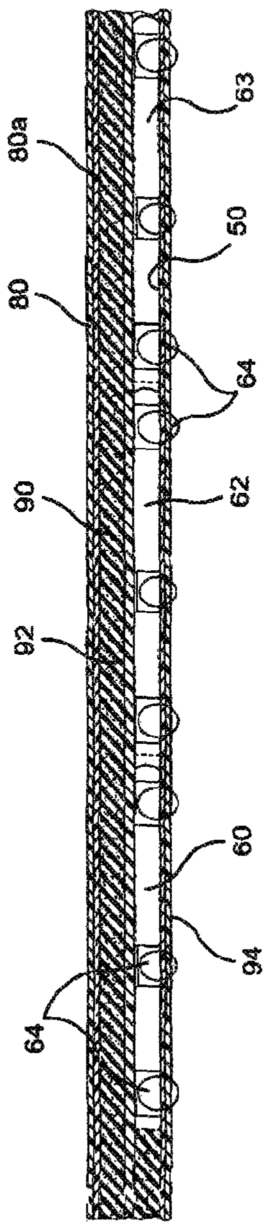
FIG. 4 is a cross-section of a portion of the FIG. 1 embodiment.

FIG. 4 has been described above. Note that it is a partial cross-section; in the preferred embodiment there are four spinal boards disposed substantially perpendicular to the sled longitudinal axis. In FIG. 4, the bottom sheet 50 is shown, with overlying, rigid spinal boards 60, 62, 63. Fixed to each spinal board are at least two (preferably five) wheel assemblies 64 which have wheel portions protruding through openings in the bottom sheet 50 and the anti-wear sheet 94. Preferably, fabric wear strips 31, 32, 33 can be affixed to the bottom sheet 50 and/or the anti-wear sheet 94, to protect the bottom sheet 50 when the mattress 10 is dragged along a surface. These wear strips may comprise Kevlar (which has an excellent co-efficient factor), ballistic nylon (which is a thick, tough, synthetic nylon fabric), or other suitable fabric.

In FIG. 4, the patient support sheet 80 preferably lies under the patient, and an optional second layer of SoffTICK™ 80*a* may be sewn, glued, stapled, and/or welded underneath the patient support sheet 80. Beneath this sheet is the foam mattress 90, which is used as a cushion and to conserve warmth for the patient. The foam mattress 90 may be ½ inch thick and be dimensioned slightly smaller than the patient support sheet 80. The foam material may comprise a fire-retardant, anti-fungal, open-cell material such as Vita B2721T1N urethane foam, available from Vitafoam Canada. Beneath the foam mattress 90 is, optionally, a reinforcing plastic sheet 92, preferably fixed to the foam mattress 90 by gluing, stapling, sewing, or welding. The reinforcing plastic sheet 92 preferably comprises two parallel sheets of rigid or semi-rigid plastic connected together by a series of orthogonal connecting walls running substantially perpendicular to the mattress longitudinal axis. A preferred reinforcing plastic sheet is Polyethylene Plastic which can be made by Modern Age Plastics Inc. of Toronto, Canada. The reinforcing plastic sheet 92 is preferably 1/16 to ½ inch thick, most preferably ⅛ inch thick, and dimensioned substantially to be ⅛ to ½ inches (preferably ¼ inches) wider/longer than the foam mattress 90. The reinforcing plastic sheet 92 provides structural stability to the foam mattress 90, and further shields the patient from the ground and the spinal boards. This sheet may be provided above and/or below the foam mattress.

The main role of the spinal boards 60, 62, 63 (and 64, not shown) is to provide additional support in the back and spinal regions. This support is particularly important when transporting an injured person (e.g., when lowering from a window, up or down a flight of stairs, etc.) because, not only will the person require additional back support, but the caregiver will require that the mattress stay somewhat planar when the person is being transported. The spinal boards provide substantial rigidity transverse to the longitudinal axis while the patient would provide needed rigidity to the longitudinal axis.

Also in FIG. 4, the spinal boards 60, 62, and 63 are shown disposed between the plastic reinforcing sheet 92 and the bottom sheet 50. Each spinal board is typically constructed from a plastic material (e.g., Polystyrene, PVC, Nylon, or other polymers, including high performance polymers) and has dimensions approximately 0.5×7.5×15.75 inches. While a 15.75 inch board is sufficient for a majority of people, in bariatric cases, the width may be increased to accommodate a larger body type. Alternately, the spinal boards may be placed side by side to increase the overall width. Preferably, the spinal board is a high density polyethylene or HDPE. A preferred plastic is made by Modern Age Plastics Inc., Canada.

Each spinal board may include a plurality (e.g., 3, 4, 5, or 6) of square openings, each approximately 1 inch×1 inch, where each is capable of receiving a wheel assembly 64 or other wheel structure. A wheel assembly 64 may be snapped, or clipped, into each square opening. Using replaceable wheel assemblies 64 that may be snapped into and out of the spinal board, as opposed to those that are permanently attached or integrated therein (which are also within the scope of the invention), allows for easy replacement should a wheel break or otherwise malfunction. This configuration also allows for interchanging the wheels for different sizes/weights/surfaces. Each wheel may be generally comprised of a single wheel within a housing, typically with an axle. The housing is configured to fit snugly within the square opening in the spinal board, and may include side pressure clips, which snap the wheel assembly in place once in the spinal board. However, it should be appreciated that the roll-up mattress is not limited to this type of wheel assembly. If the mattress is used in a snowy region, for example, it may be advantageous to completely omit casters all together and/or to use small skid plates.

In a preferred embodiment, little-to-none of the materials used to fabricate the spinal board would be metallic or any other material that may interfere with an X-ray machine. This is important because the foldup mattress 10 may stay with the patient even during X-ray procedures, particularly when the patient is in a delicate state and should not be moved until X-rays are complete. Suitable materials would include, for example, various plastics, Polystyrene, PVC, Nylon, or other polymers, including high performance polymers. Each spinal board preferably has plural wheel assemblies 64, which provide proper rolling support for the patient. Preferably, the plural wheel assemblies are respectively disposed along three axes substantially perpendicular to the mattress longitudinal axis. The wheel assemblies may comprise individual wheels mounted on individual axles, but may comprise cylindrical rollers extending all or part way across the length of the spinal board, and/or ball-bearings, and/or any known and convenient means to support the patient's movement along a surface. The most preferred embodiment has five individual wheel assemblies 64 fixed to the bottom of each spinal board, with one wheel assembly near each of the four corners of the spinal board, and one wheel assembly disposed substantially in the center of the spinal board.

Further in FIG. 4, the bottom sheet 50 has one or more holes or openings therein for the wheels to extend through so that the wheels contact the surface. In a preferred embodiment, a wheel bracket which holds the wheel axle is used to fix the spinal board to the bottom sheet 50. Beneath the bottom sheet 50 is, preferably, the anti-wear plastic sheet 94, which may be similar to the optional reinforcing plastic sheet 92, but serves not only to reinforce the structural integrity of the mattress 10, but serves as a skid/wear/slip plate to keep the bottom sheet 50 from being anti-wear reinforcing plastic sheet 94 has one or more opening therein so that the wheel assemblies 64 may be exposed to the surface, as shown schematically in FIG. 3. Each wheel assembly preferably comprises a wheel, axle, and bracket/housing, which are all preferably visible from the bottom of the mattress 10.

In the preferred embodiments, the patient support sheet 80 and the bottom sheet 50 are preferably constructed from a material that meets infection control measures, but may also contain microclimate features. In a preferred embodiment, the skin may be constructed from SoffTICK™ Standard Institutional Fabric Ultra 53-14, available from Vintex Inc. at www.vintex.com. Ultra 53-14 is advantageous because it is soft, flame retardant, durable, resistant to bacteria/fungal growth, self-deodorizing, hypo-allergenic, non-irritating and foam compatible, plastic sheet material. The entire bottom sheet 50 may be made from the Ultra 53-14 or from a more durable material. Suitable materials include, for example, Kevlar, or ballistic nylon, which may cover only a portion of the bottom sheet 50. Forming the entire lower sheet from a single durable material, although typically more expensive than regular skin, would eliminate the need to cut and bond a second material to the lower skin thereby reducing labor and some material costs.

An alternative solution to maintaining an anti-fungal and anti-bacterial mattress surface 80 may be to coat the mattress skin with spray-on liquid glass (also referred to as "SiO2 ultra-thin layering"). Spray-on liquid glass is transparent, non-toxic, and can protect virtually any surface against almost any damage from hazards such as water, UV radiation, dirt, heat, and bacterial infections. Liquid glass coating is also flexible and breathable, making it suitable for use on both traditional mattresses and evacuation mattress (e.g., the roll up mattress).

The straps may be constructed from a strong fabric woven as flat strips and/or tubes. The flat type of material is more commonly known as webbing. The webbing may be woven from, for example, nylon, polypropylene, polyester, high-modulus polyethylene (e.g., Dyneema®), para-aramid synthetic fiber (e.g., Kevlar®), cotton, flax, and combinations thereof. While the webbing used to form the straps may be flat, for added strength, the webbing may partially encircle a core material, or be folded lengthwise around the core material. To seal the core material within the webbing, the edges of the webbing may be stitched, fused, or otherwise sealed along portions of the length of the strap portion or portions having a core, thereby preventing the core material from becoming disassociated with the webbing. The core material may be, for example, rope, hollow tube, cabling, etc. To the extent that communications or patient-monitoring electronics are incorporated into the evaluation mattress 10, wires, fiber optics, or other conductors may be embedded within the core (e.g., within a tube or conduit) to communicate signals from end to end.

Figure 5:
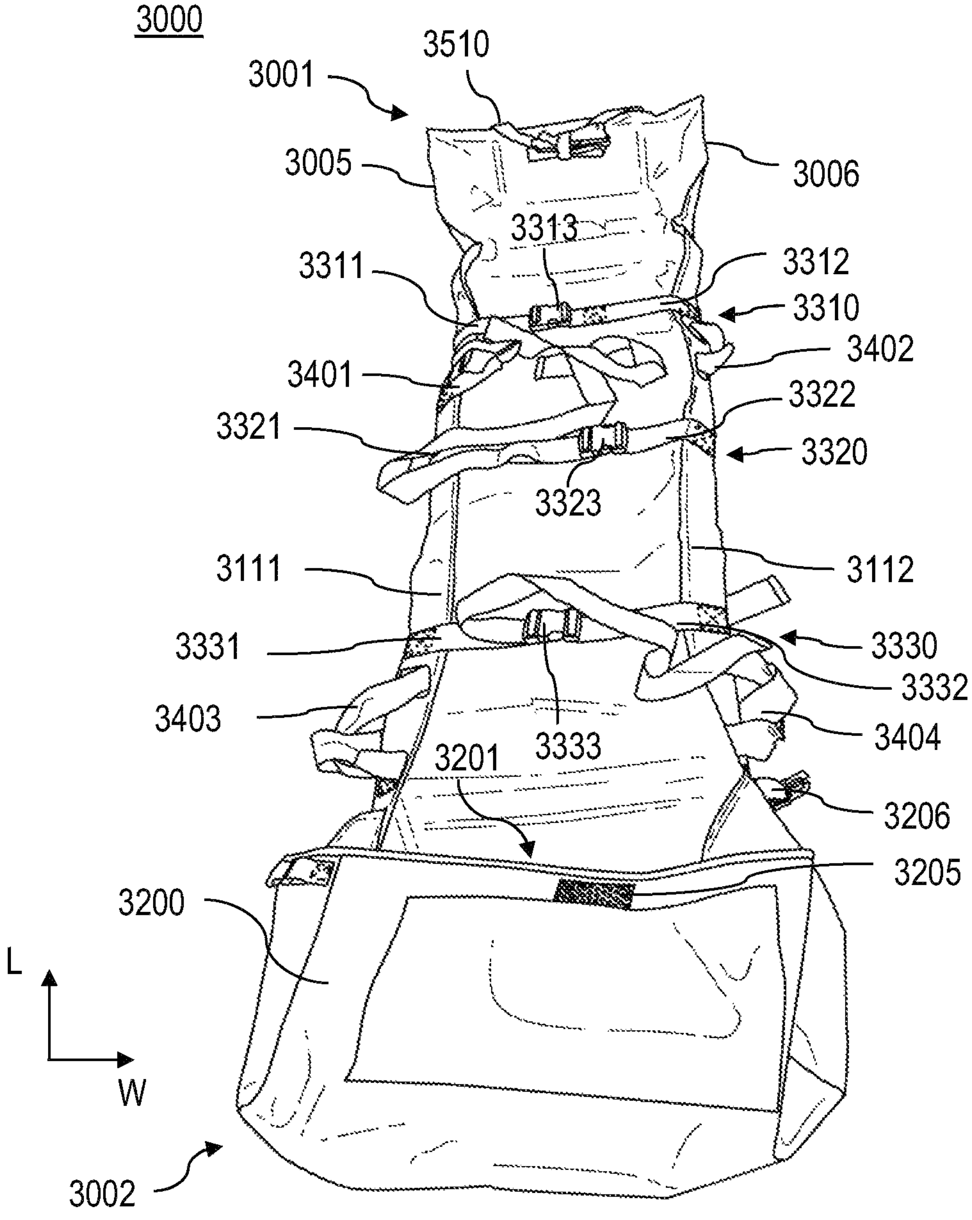
FIG. 5 is a perspective front view of rollup patient evacuation sled according to another embodiment of the present invention.

With reference to FIG. 5, shown is a perspective front view of rollup evacuation sled 3000 according to an embodiment of the present invention. With reference to FIGS. 6A-6D, shown are perspective views of the rollup evacuation sled 3000 while the sled 3000 is being rolled up and packed in its own foot pouch 3200. With reference to FIG. 7, shown is an exemplary perspective view of the rolled-up sled 3000 packed in the foot pouch 3200, which can be carried by a user or caregiver.

The embodiment of rollup evacuation sled 3000 of the disclosed invention has a similar structure to the foldup patient evacuation sled 10 shown in FIGS. 1-4. The rollup evacuation sled 3000, however, is designed not only for healthcare but also for other general purpose uses beyond the healthcare to transport a person such as a patient, victim, rescue, etc. to a safe place when such transportation is needed. The rollup evacuation sled 3000 in this embodiment is configured to have foot pouch 3200 instead of the foot flap 13 of the foldup patient evacuation sled 10. The foot pouch 3200 is configured to substantially enclose feet and lower calves of a person when the person is lying on the support sheet 3104 (shown in FIG. 9), and is also configured to store the sled 3000 when the sled 3000 is rolled up from the head end 3001 along a longitudinal direction L. For this purpose, some elements of the rollup evacuation sled 3000 are constructed or arranged differently from the elements of the foldup patient evacuation sled 10. As shown in FIG. 6D, when the sled 3000 is rolled up, the sled 3000 can be compactly stored in its own the foot pouch 3200. The foot pouch 3200 may work as a storage bag for the sled 3000 and can be conveniently carried by a user as shown in FIG. 7.

For compact packing, the rollup evacuation sled 3000 may be narrower in width direction W than the foldup patient evacuation sled 10 shown in FIGS. 1-4, but provides substantially the similar utilities to the foldup patient evacuation sled 10 for rapid evacuation during emergency and non-emergency situations. In particular, the rollup evacuation sled 3000 is configured to provide safe, rapid evacuations or transports of a person (patient, victim, rescue, etc.) in public venues such as shopping malls, airports, stadiums, schools, office buildings, etc. The rollup evacuation sled 3000 provides advantages that the sled 3000 can be stored easily and carried conveniently by a user or caregiver, enabling rapid use of the sled 3000 for a person in unexpected emergency situations in public places.

Figure 8:
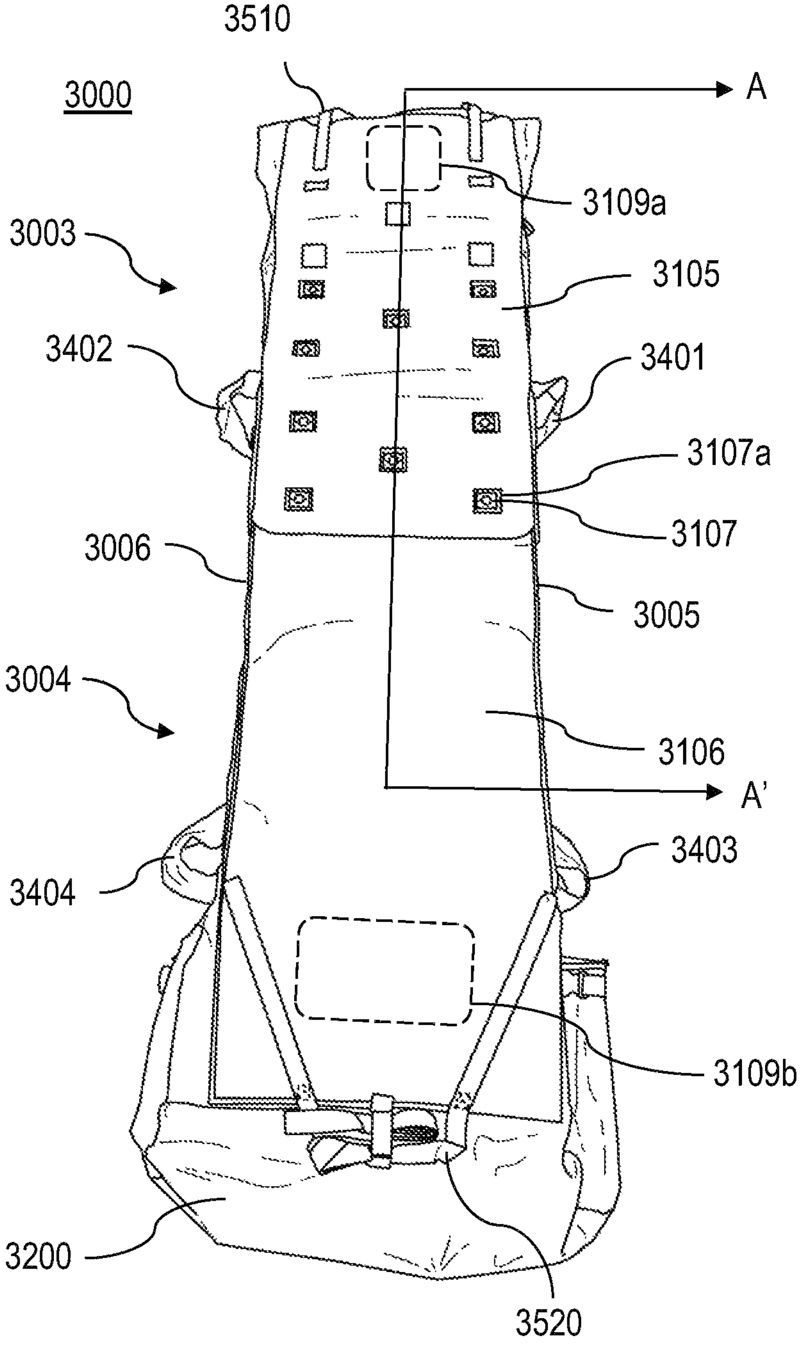
FIG. 8 is a perspective rear view of the rollup patient evacuation sled.
Figure 9:
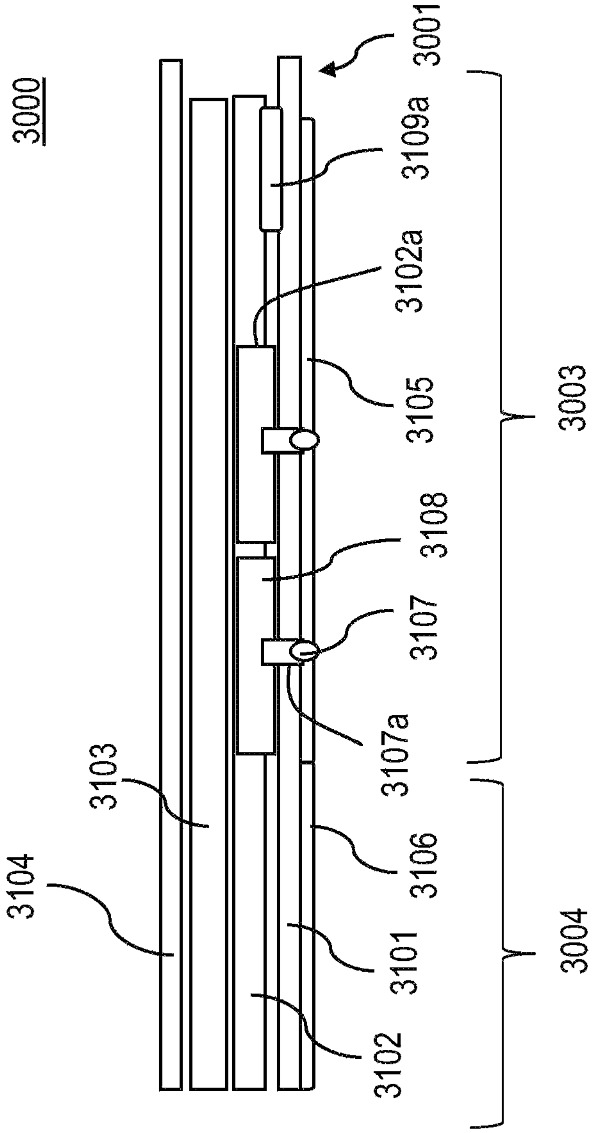
FIG. 9 is a cross-sectional view of the cross section A-A' of the rollup patient evacuation sled shown in FIG. 8.

With reference to FIG. 8, shown is a perspective rear view of the rollup evacuation sled 3000 of the embodiment of the disclosed invention. With reference to FIG. 9, shown is a cross-sectional view of the cross section A-A' of the rollup evacuation sled 3000 shown in FIG. 8.

Referring to FIGS. 5, 8 and 9, the rollup evacuation sled 3000 of the disclosed invention includes a bottom sheet 3101, a first foam mattress 3102 disposed above the bottom sheet 3101, a second foam mattress 3103 disposed above the first foam mattress 3102, support sheet 3104 disposed above the second foam mattress 3103. These bottom sheet 3101, foam mattresses 3102, 3103 and the support sheet 3104 may form a base stack that supports a person (patient, victim, rescue, etc.) lying on the support sheet 3104. The foam mattresses 3102, 3103 are used as a cushion and to conserve warmth for the person. Each foam mattress 3102, 3103 may be ½ inch thick and be dimensioned slightly smaller than the support sheet 3104. The foam material may comprise a fire-retardant, anti-fungal, open-cell material. For example, the foam material may be Vita B2721T1N urethane foam, available from Vitafoam Canada. However, the foam material is not limited to this brand, but may be any fire-retardant, anti-fungal, open-cell material.

The rollup evacuation sled 3000 further includes one or more spinal boards 3108 disposed between the bottom sheet 3101 and the second foam mattress 3103. The first foam mattress 3102 has one or more openings 3102*a* to house the one or more spinal boards 3108. The spinal boards 3108 are disposed inside the openings of 3102*a* of the first foam mattress 3102. In the embodiment of the rollup evacuation sled 3000, the spinal boards 3108 may be placed in upper section 3003 of the bottom sheet 3101 to enable the sled 3000 to be easily rolled up. When the sled 3000 includes two or more spinal boards 3108, the spinal boards may be spaced apart from each other and may be arranged along the longitudinal direction L. In the embodiment of the disclosed invention, the sled 3000 preferably has two spinal boards 3108 arranged along the longitudinal direction. The spinal boards 3108 may not be placed in the lower section 3004. The spinal boards 3108 substantially support a chest/waist portions of a person when the person is lying on the support sheet 3104. The spinal boards provide substantial rigidity transverse to the longitudinal axis while the person would provide needed rigidity to the longitudinal axis.

The rollup evacuation sled 3000 further includes first poly stiffener sheets 3109*a*, for head/neck support, and second poly stiffener sheet 3109*b* for foot/ankle support. These stiffener sheets provide additional spinal support. The poly stiffening sheets 3109*a*, 3109*b* may be disposed between the bottom sheet 3101 and the first foam mattress 3102. The first stiffening sheet 3109*a* is placed on a location substantially corresponding to head/neck portions of a person when the person is lying on the support sheet 3104. The second stiffening sheet 3109*b* is placed on a location that substantially corresponds to foot/ankle portion of a person, under the foot pouch 3200. The second foam mattress 3103 may not extend to the portion where the second stiffening sheet 3109*b* is formed.

Anti-wear sheet 3105 may be affixed to a bottom surface of the bottom sheet 3101, substantially covering the upper section 3003. The anti-wear sheet 3105 provides durability to the bottom of the sled 3000. Anti-wear sheet 3105 may be sewn on the bottom sheet 3101. The anti-wear sheet 3105 is semi-rigid PVD several centimeters thick, and adds durability to the bottom of the sled in instances where multiple evacuations or extended evacuations are needed. A heavy-duty sheet 3106 may be affixed to a bottom surface of the bottom sheet 3101, substantially covering the lower section 3004. The heavy duty sheet 3106 is coated with anti-fungal, anti-bacterial and fire-retardant materials, and may be sewn on the bottom sheet 3101.

The rollup evacuation sled 3000 further includes wheel assemblies 3107 affixed to the rigid spinal board 3108. The bottom sheet 3101 and anti-wear sheet 3105 may have openings 3107*a* to make the wheels of the wheel assemblies 3107 protrude out of the bottom sheet 3101 and anti-wear sheet 3105. The wheel assemblies 3107 make the towing easier when the sled 3000 with a person lying on the support sheet 3104 is towed on a floor. In the embodiment of the disclosed invention, each spinal board has five (5) wheel assemblies.

Optionally, a stiffening layer may be sewn, glued, stapled, and/or welded underneath the support sheet 3104 (see stiffening layer 80*a* in FIG. 4). A reinforcing plastic sheet may be fixed to the foam mattress 3103 by gluing, stapling, sewing, or welding (see reinforcing sheet 92 in FIG. 4). The reinforcing plastic sheet provides structural stability to the foam mattress 3103, and further shields the person from the ground and the spinal boards. This sheet may be provided above and/or below the foam mattress.

At the left and right side peripheral portions 3005, 3006 of the sled 3000, sandwiched margin left side 3111 and sandwiched margin right side 3112 are formed. These sandwiched margin left and right sides 3111, 3112 may be formed of a margin stack that includes peripheral portions of the bottom sheet 3101 and the support sheet 3104. The foam mattresses 3102, 3103 may not be included in the sandwiched margin left and right sides 3111, 3112 to provide flatter surfaces to affix various straps and handles to the sandwiched margin left and right sides 3111, 3112.

The rollup evacuation sled 3000 includes foot pouch 3200 formed at the foot end 3002. The foot pouch 3200 is dimensioned to substantially enclose feet and lower calves of a person lying on the support sheet 3104, and also is configured to store the sled 3000 in a compact way when the sled 3000 is rolled up along the longitudinal direction L from the head end 3001. The foot pouch 3200 may have a shape of a pouch or bag with an opening 3201 formed in the direction toward the head end 3001 such that the rolled-up sled 3000 can be stuffed in its own foot pouch 3200 through the opening 3201, as shown in FIGS. 6A-6D. Through the opening 3201, feet and lower calves of the person may be placed inside the foot pouch 3200 and are enclosed by the foot pouch 3200, when the sled 3000 is in use.

Figure 6B:
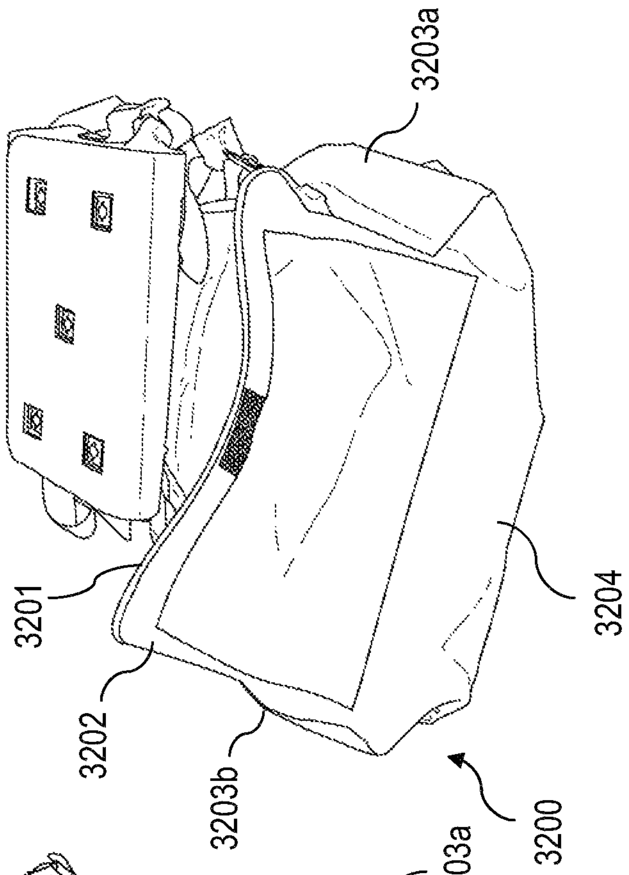
FIGS. 6A-6D are perspective views of the rollup patient evacuation sled while the rollup patient evacuation sled is being rolled up and packed in a foot pouch.
Figure 6A:
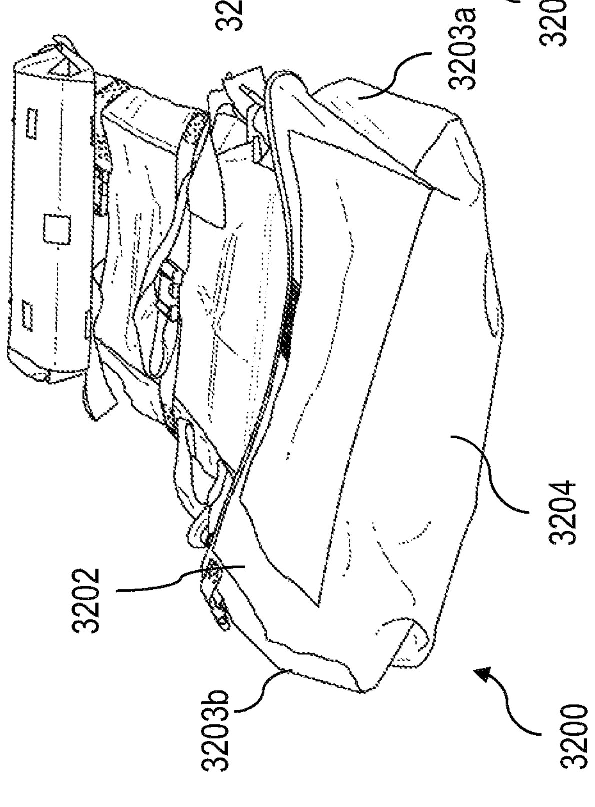
Figure 6D:
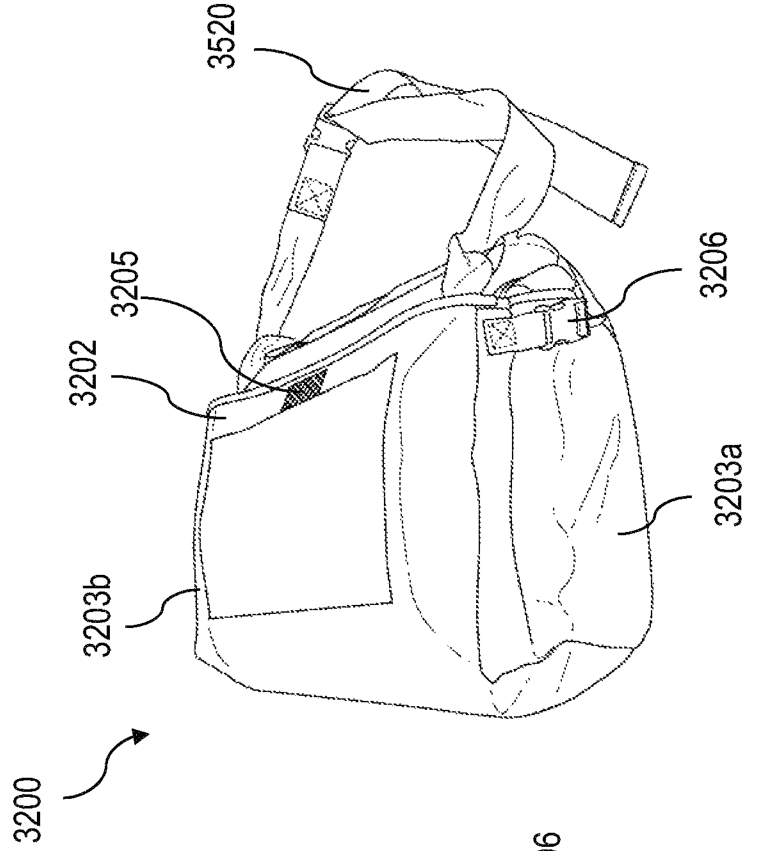
Figure 6C:
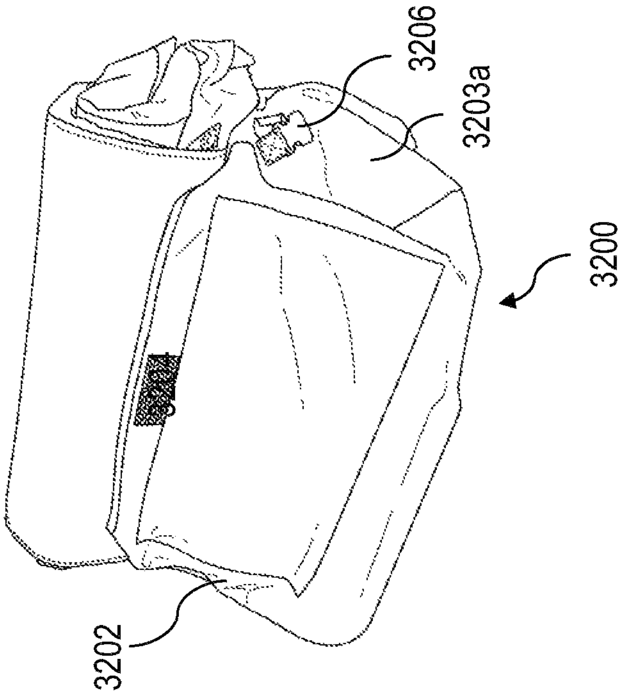
Figure 7:
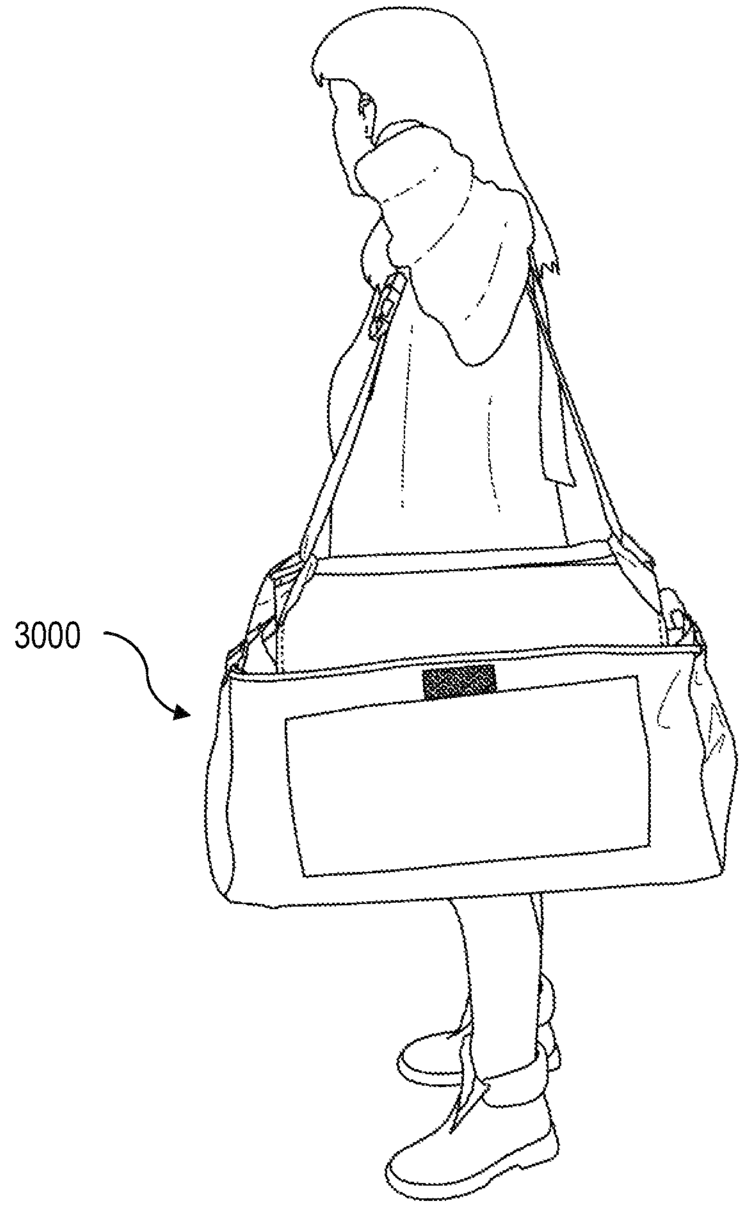
FIG. 7 is an exemplary perspective view of the rollup patient evacuation sled packed in the foot pouch which may be carried by a user.

Referring to FIGS. 6A-6D, the foot pouch 3200 includes top cover 3202 that substantially covers feet and lower calves of the person, right and left side covers 3203*a*, 3203*b* connected to the top cover 3202 and respectively connected to the sandwiched margin right and left sides 3112, 3111, and lower side cover 3204 formed opposite side of the opening 3201. A reflector or reflection tape 3205 may be attached on the top cover 3202 for easy recognition of the pouch 3200 storing the sled 3000. The sled 3000 is rolled up from the head end 3001 (FIGS. 6A-6B). When rolled-up sled 3000 reaches the opening 3201 of the foot pouch 3200, the rolled-up sled 3000 is stuffed in the foot pouch 3200 (FIG. 6C). When the rolled-up sled 3000 is completely stored in the foot pouch 3200, the entire rolled-up sled 3000 becomes a form of a bag or pouch 3200 (FIG. 6D) that can be conveniently carried by a user as shown in FIG. 7.

The foot pouch 3200 may have right side cover strap 3206 that may be respectively affixed to a top (or left edge of the top cover 3202) and bottom portions of the right side cover 3203*a*. The right side cover strap 3206 is configured to be buckled to secure the foot pouch 3200. In the same way, the foot pouch 3200 may have left side cover strap (not shown) respectively affixed to a top (or right edge of the top cover 3202) and bottom portions of the left side cover 3203*b*. The left side cover strap is configured to be buckled to secure the foot pouch 3200.

The rollup evacuation sled 3000 further includes a plurality of horizontal straps. The horizontal straps are disposed along a direction substantially perpendicular to the longitudinal direction L. The horizontal straps at least include chest strap 3310, waist strap 3320, and thigh strap 3330. These horizontal straps are color coded to make connections/disconnections quick and easy for healthcare worker as well as lay rescuers. Color coding is for user friendliness so that any lay person can easily deploy the sled, without training, as intuitive matching colors as well as any healthcare trained emergency responder. For example, the chest strap 3310 is preferably blue, the waist strap 3320 is preferably yellow, and thigh strap 3330 is preferably orange. However, the color codes are not limited to these colors.

The chest strap 3310 includes a strap portion 3311, a strap connector portion 3312, and a connector 3313. Preferably, the strap portion 3311 may be affixed to the sandwiched margin left side 3111 and the strap connector portion 3312 may be affixed to the sandwiched margin right side 3112. When connected and tightened, the horizontal chest strap 3310 may pull up the sandwiched margin left and right sides 3111, 3112 to at least partially cover the left and right sides of chest portion of the person.

The waist strap 3320 includes a strap portion 3321, a strap connector portion 3322, and a connector 3323. Preferably, the strap portion 3321 may be affixed to the sandwiched margin left side 3111 and the strap connector portion 3322 may be affixed to the sandwiched margin right side 3112. When connected and tightened, the horizontal waist strap 3320 may pull up the sandwiched margin left and right sides 3111, 3112 to at least partially cover the left and right sides of waist portion of the person.

The thigh strap 3330 includes a strap portion 3331, a strap connector portion 3332, and a connector 3333. Preferably, the strap portion 3331 may be affixed to the sandwiched margin left side 3111 and the strap connector portion 3332 may be affixed to the sandwiched margin right side 3112. When connected and tightened, the horizontal thigh strap 3330 may pull up the sandwiched margin left and right sides 3111, 3112 to at least partially cover the left and right sides of thigh portion of the person. FIG. 5 exemplarily shows the chest strap 3310, waist strap 3320, and thigh straps 3330. However, the straps are not limited to these straps, and additional straps may be affixed to the sandwiched margin left and right sides 3111, 3112 of the sled 3000.

The rollup evacuation sled 3000 further includes a plurality of loop/side carrying handles. For example, the loop/side carrying handles may include first left loop/side carrying handle 3401 and first right loop/side carrying handle 3402, which may be affixed to the sandwiched margin left and right sides 3111, 3112, respectively. The loop/side carrying handles may further include second left loop/side carrying handle 3403 and second right loop/side carrying handle 3404, which may be affixed to the sandwiched margin left and right sides 3111, 3112, respectively. FIG. 5 exemplarily shows the first left and right loop/side carrying handles 3401, 3402 around the chest strap 3310, and the second left and right loop/side carrying handles 3403, 3404 around the thigh strap 3330. However, the number of the loop/side carrying handles is not limited to two. There may be more loop/side carrying handles. The positions of the loop/side carrying handles are not limited to these positions as shown in FIG. 5.

The rollup evacuation sled 3000 further includes head roll/tow strap 3510 affixed to the head end portion of the sled 3000 and foot roll/tow strap 3520 affixed to foot end portion of the sled 3000. The head and foot roll/tow straps 3510, 3520 may be affixed to head end portion and foot end portion of the bottom sheet 3101, respectively. The foot roll/tow straps 3520 is designed for a caregiver to roll the sled 3000 on underside wheel assemblies to safety from the foot end while a person is lying on the sled. A rescuer at foot end is a lead rescuer and a second rescuer is used to be at head end; alternatively, one rescuer may roll or tow the sled 3000 without the assistance of a second rescuer. The sled 3000 can be rolled or towed from either head end or foot end horizontally. However, when the sled 3000 is rolled or towed in a downward direction such as a slope or downstairs, the sled 3000 is designed to be only rolled or towed from the foot end, because the sled 3000 is designed such that underside foot end area is the built-in braking system area for control during substantially vertical or downward evacuation. The towing is made easier by the provision of the wheel assemblies 3109 on the bottom surface of the sled 3000.

The individual components shown in outline or designated by blocks in the attached drawings are all well-known in the sled and mattress arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions. All U.S. and foreign patent documents, all articles, brochures, and all other published documents discussed above are hereby incorporated by reference into the Detailed Description.

What is claimed is:

1. A rollup evacuation sled, comprising;

a bottom sheet having a head end and a foot end, wherein the bottom sheet includes an upper section and a lower section;

a first foam mattress disposed above the bottom sheet;

a second foam mattress disposed above the first foam mattress;

a support sheet disposed above the second foam mattress, wherein a margin stack comprising periphery portions of the bottom sheet and the support sheet forms a sandwiched margin left side and a sandwiched margin right side;

a plurality of spinal boards disposed between the bottom sheet and the second foam mattress in the upper section of the bottom sheet, wherein the spinal boards are spaced apart from each other and wherein the first foam mattress has a plurality of openings in which the spinal boards are respectively disposed;

a plurality of wheel assemblies mounted on each spinal board, wherein each wheel assembly has a wheel extending through respective holes in the bottom sheet;

a foot pouch coupled to the sandwiched margin left and right sides and dimensioned to substantially enclose feet and lower calves of a person lying on the support sheet, wherein the foot pouch is configured to store a stack including the bottom sheet, first and second foam mattresses, spinal boards, and the support sheet, when the stack is rolled up along a longitudinal direction from the head end;

a first stiffening sheet that supports a head/neck portion of the person, wherein the first stiffening sheet is disposed between the bottom sheet and the first foam mattress in the upper section; and a second stiffening sheet that supports a foot/ankle portion of the person, wherein the second stiffening sheet is disposed between the bottom sheet and the first foam mattress in the lower section under the foot pouch.

2. The rollup evacuation sled of claim 1 wherein the spinal boards are disposed only in the upper section and substantially support a chest/waist portion of the person.

3. The rollup evacuation sled of claim 1 wherein the plurality of spinal boards are arranged along the longitudinal direction.

4. The rollup evacuation sled of claim 1 further comprising at least one anti-wear sheet affixed to a bottom surface of the bottom sheet in the upper section.

5. The rollup evacuation sled of claim 1 further comprising at least one heavy duty layer affixed to a bottom surface of the bottom sheet in the lower section, wherein the heavy duty layer is coated with anti-fungal, anti-bacterial and fire-retardant materials.

6. The rollup evacuation sled of claim 1 wherein the foot pouch comprises:

a top cover that substantially covers feet and lower calves of the person; and left and right side covers connected to the top cover and respectively connected to the sandwiched margin left side and the sandwiched margin right side.

7. The rollup evacuation sled of claim 6 further comprising:

a left side cover strap respectively affixed to a top and bottom portions of the left side cover; and a right side cover strap respectively affixed to a top and bottom portions of the right side cover, wherein the left and right side cover straps are configured to be buckled to fasten the foot pouch.

8. The rollup evacuation sled of claim 6 further comprising a reflector formed on the top cover of the foot pouch.

9. The rollup evacuation sled of claim 1 further comprising a horizontal thigh strap affixed respectively to the sandwiched margin left side and to the sandwiched margin right side, wherein the horizontal thigh strap includes a strap portion, a strap connector portion, and a connector that couples the strap portion to the strap connector portion, and wherein the horizontal thigh strap has a first color.

10. The rollup evacuation sled of claim 1 further comprising a horizontal waist strap affixed respectively to the sandwiched margin left side and to the sandwiched margin right side, wherein the horizontal waist strap includes a strap portion, a strap connector portion, and a connector that couples the strap portion to the strap connector portion, and wherein the horizontal waist strap has a second color.

11. The rollup evacuation sled of claim 1 further comprising a horizontal chest strap affixed respectively to the sandwiched margin left side and to the sandwiched margin right side, wherein the horizontal chest strap includes a strap portion, a strap connector portion, and a connector that couples the strap portion to the strap connector portion, and wherein the horizontal chest strap has a third color.

12. The rollup evacuation sled of claim 1 further comprising:

a foot roll/tow strap affixed to a bottom surface of the bottom sheet in the lower section, wherein the foot roll/tow strap is configured such that one or more caregivers roll or tow the person lying on the support sheet; and a head roll/tow strap affixed to a bottom surface of the bottom sheet in the upper section, wherein the head roll/tow strap is configured such that the one or more caregivers roll or tow the person lying on the support sheet.

13. The rollup evacuation sled of claim 1 further comprising a plurality of loop/side carrying handles affixed to the sandwiched margin left side and to the sandwiched margin right side.

14. A rollup evacuation sled, comprising;

a bottom sheet having a head end and a foot end, wherein the bottom sheet includes an upper section and a lower section;

a foam mattress disposed above the bottom sheet;

a support sheet disposed above the mattress, wherein a margin stack comprising periphery portions of the bottom sheet and the support sheet forms a sandwiched margin left side and a sandwiched margin right side;

a plurality of horizontal straps affixed respectively to the sandwiched margin left side and to the sandwiched margin right side, wherein the horizontal straps are disposed along a direction substantially perpendicular to a longitudinal direction to tighten a person lying on the support sheet;

a plurality of spinal boards disposed between the bottom sheet and the mattress in the upper section of the bottom sheet, wherein the spinal boards are spaced apart from each other;

a plurality of wheel assemblies mounted on each spinal board, wherein each wheel assembly has a wheel extending through respective holes in the bottom sheet;

at least one anti-wear sheet affixed to a bottom surface of the bottom sheet in the upper section;

at least one heavy duty layer affixed to the bottom surface of the bottom sheet in the lower section, wherein the heavy duty layer is coated with anti-fungal, anti-bacterial and fire-retardant materials;

a foot pouch coupled to the sandwiched margin left and right sides and dimensioned to substantially enclose feet and lower calves of the person lying on the support sheet, wherein the foot pouch is configured to store a stack including the bottom sheet, mattresses, spinal boards, and the support sheet, when the stack is rolled up along the longitudinal direction from the head end;

a first stiffening sheet that supports a head/neck portion of the person, wherein the first stiffening sheet is disposed between the bottom sheet and the foam mattress in the upper section;

a second stiffening sheet that supports a foot/ankle portion of the person, where in the second stiffening sheet is disposed between the bottom sheet and the support sheet in the lower section under the foot pouch; and an additional foam mattress disposed between the bottom sheet and the foam mattress, wherein the additional foam mattress has a plurality of openings in which the spinal boards are respectively disposed.

15. The rollup evacuation sled of claim 14 wherein the spinal boards are disposed only in the upper section and substantially support a chest/waist portion of the person.

16. The rollup evacuation sled of claim 14 wherein the plurality of spinal boards are arranged along the longitudinal direction.

17. The rollup evacuation sled of claim 14 wherein the foot pouch comprises:

a top cover that substantially covers feet and lower calves of the person; and left and right side covers connected to the top cover and respectively connected to the sandwiched margin left side and the sandwiched margin right side.

18. The rollup evacuation sled of claim 14 wherein the plurality of horizontal straps comprises:

a horizontal thigh strap affixed respectively to the sandwiched margin left side and to the sandwiched margin right side, wherein the horizontal thigh strap includes a strap portion, a strap connector portion, and a connector that couples the strap portion to the strap connector portion;

a horizontal waist strap affixed respectively to the sandwiched margin left side and to the sandwiched margin right side, wherein the horizontal waist strap includes a strap portion, a strap connector portion, and a connector that couples the strap portion to the strap connector portion; and a horizontal chest strap affixed respectively to the sandwiched margin left side and to the sandwiched margin right side, wherein the horizontal chest strap includes a strap portion, a strap connector portion, and a connector that couples the strap portion to the strap connector portion.

19. The rollup evacuation sled of claim 14 further comprising:

a foot roll/tow strap affixed to a bottom surface of the bottom sheet in the lower section, wherein the foot roll/tow strap is configured such that one or more caregivers rolls or tow the person lying on the support sheet; and a head roll/tow strap affixed to a bottom surface of the bottom sheet in the upper section, wherein the head roll/tow strap is configured such that the one or more caregivers roll or tow the person lying on the support sheet.

20. The rollup evacuation sled of claim 1 wherein the second foam mattress is configured not to cover the second stiffening sheet.

21. The rollup evacuation sled of claim 14 wherein the additional foam mattress is disposed between the bottom sheet and the foam mattress and the mattress is configured not to cover the second stiffening sheet.

* * * * *